Sept. 12, 1933.  J. P. EASTMAN  1,926,270
PRESSED-ON HOSE COUPLING
Filed Aug. 13, 1932
Fig. 1
Fig. 2
Fig. 3
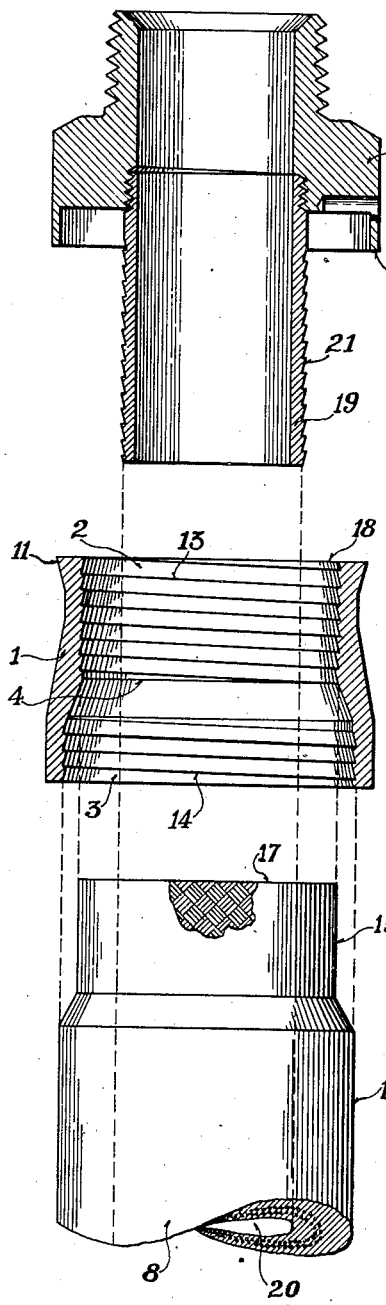
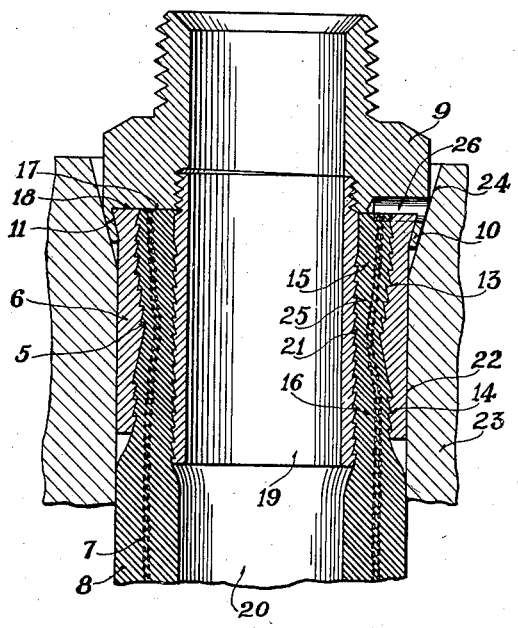
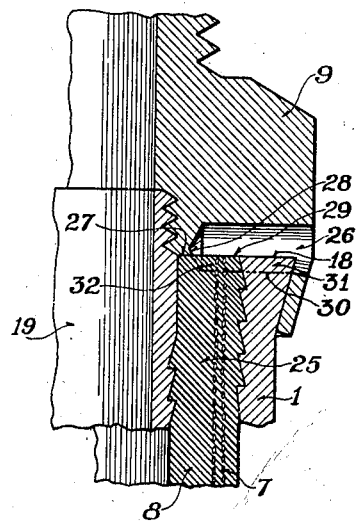
Joseph Peter Eastman
Inventor Patented Sept. 12, 1933

1,926,270

UNITED STATES PATENT OFFICE 1,926,270

PRESSED-ON HOSE COUPLING

Joseph Peter Eastman, Manitowoc, Wis.

Application August 13, 1932. Serial No. 628,667

3 Claims. (Cl. 285—84)

The invention applies to hose couplings, and to that class of the same known as pressed-on couplings. It is an improvement upon the invention described in my Patent No. 1,808,101, issued June 2, 1931, and upon the invention described in my co-pending application, Serial No. 484,046, filed September 24, 1930.

It provides a pressed-on coupling in which the sleeve and the body are originally made as two separate parts, the main advantage being visibility during assembly. That is to say, the end portion of a hose can be inserted into the sleeve to just the right distance, because the cut-off end of the hose can be seen; and thereafter the body can be attached to the shell.

It provides also an improvement in the barbs or coarse threadings which grip the hose in a coupling.

It provides also a means for preventing the building up of pressure against the annular end-wall of the coupling, such pressure tending to blow the coupling off.

In the drawing:—

Fig. 1 shows the coupling before assembling and contracting.

Fig. 2 shows the coupling after assembling and contracting.

And Fig. 3 is an enlarged broken away, sectional view of the pressure relief mechanism.

Referring to the drawing:—

The following features in the present drawing are the same as shown in my co-pending application above named:—

The shell 1 has, before contraction, as shown in Fig. 1, the upper, narrower bore 2, and the lower, wider bore 3. The lower edge 4 of said upper bore 2, before contraction, becomes in Fig. 2, after contraction, the apex 5 of the annular triangle 6, which bites into the wire braiding 7 of the hose 8.

The new features of the present invention are as hereinafter described.

The body 9 and said shell 1 are originally made as separate members, as shown in Fig. 1. Said body 9 has the flange 10, which is shown in Fig. 1 as projecting vertically downward ready to receive the cone shaped annular bead 11 at the top of the shell 1; and which is shown in Fig. 2 as closed down over said bead, to permanently join the body and the shell.

The threading 13 in said upper bore 2, and the threading 14 in said lower bore 3 are both of the same direction, both being right hand threads, and are both of the same pitch. Therefore these two threads co-operate with each other. Hence when the hose is inserted into said shell, both of the threads 13 and 14 can be made to bite into the hose. That is, the thread 13 will bite into the reduced end 15 of the hose 8, and the thread 14 will bite into the full-sized portion 16 of said hose.

This is in contrast with the construction shown in my co-pending application, in which the two threads are in opposite directions. This change makes it possible to reduce the diameter of said lower bore 3 to fit the hose more snugly, thereby making it possible to reduce also the outside diameter of said lower bore, whereby the coupling can be made from a smaller bar, economizing material.

Another advantage is that, because both threads are in the same direction, an operation in machining is saved.

When flexible metal-lined hose is used, such as is shown in my issued patent above-named, the right and left threads are an advantage, as preventing unscrewing. But the tendency to unscrew disappears in high pressure work in which wire-braided hose is employed, as is the case in the present invention, and when an insert is employed as a reinforcement, and great pressure is used upon the sleeve. Therefore in the present invention the right and left threads construction is abandoned, with advantages as described.

In practice the hose 8 is screwed into the shell 1 until the cut-off end 17 of the hose is just flush with the upper edge 18 of the shell 1, the internal threadings 13 and 14 co-operating to facilitate such screwing in, in manner hereinbefore described.

The tubular internal reinforcement, or insert, 19, having first been screwed into the body 9, said insert 19 is now screwed into the bore 20 of the hose, by means of external threading 21 provided on said insert, until the body 9 has been drawn down on to said upper edge 18 of the shell 1, the flange 10 fitting over the bead 11.

The hose and coupling are then pushed down into the cylindrical bore 22 of the die 23 until the conical mouth 24 of said die has bent the flange 10 inward to press firmly against the bead 11, locking the body and shell together. Thus, the contracting of the shell on to the hose, and the locking of the shell and body together, are done in one operation.

The screwing of the hose into the shell has the effect of temporarily reducing the bore of the hose, making it the more difficult to enter the insert 19 into the hose, and hence making it the more desirable to provide the thread 21 hereinabove described, on the outside of the insert 19, instead of the annular barbs that are usual.

The space into which the hose 8 enters, between the shell 1 and the insert 19, may be referred to as the annular chamber 25. The relief hole 26 is drilled into the body 9, before the body and shell are assembled, as shown in Fig. 1, in a radial direction, that is to say, parallel with the direction of the annular endwall 27 of the body 9.

Then, after such assembly, said upper edge 18 of the shell partially closes said hole, but, none the less, the bottom 28 of said hole extends beyond said upper edge 18, whereby it keeps the upper end 29 of said chamber 25 in communication with the outer air.

Accordingly, when the assembled hose and coupling, Fig. 2 or Fig. 3, are in use, if a leakage of air, water, or grease takes place from within the bore 20 of the hose, past the insert 19, into said upper end 29 of the annular chamber 25, such leakage can escape through said hole, whereby the building up of pressure against said annular end wall 27 of the body, tending to blow the body off, is avoided.

This arrangement differs from that described in my said co-pending application in the following respects:—In that application the hole 33, Fig. 4, is expected to become filled with rubber, Fig. 4, during the contracting, whereby the assembled coupling goes into use with said hole 33 sealed with rubber. Whereas in the present invention, a hose is contemplated in which the nature of the rubber is such that it does not tend to "flow" under pressure.

And it is now expressly stated that, should flowing occur during contracting, the intention is to drill the hole out again after contraction, as shown by the broken line 30, Fig. 3, thereby removing an intervening portion 31 of the shell and removing also a portion 32 of the hose substance, whereby a radial groove is formed in said cut off end 17 of the hose.

Therefore, whether flowing has occurred or not, the hose and coupling go into use with said relief hole 26 an open, not a closed, hole, its direction adapting it to effectually tap any leakage. And I may provide more than one of such radial relief holes. Or, I may put the hole in a slanting direction, to avoid the insert, whereby said hole is enabled to extend a longer distance across the end of the hose, in order that it may the more effectually tap any leakage.

I claim:

1. A hose coupling in use upon a hose comprising an end wall, a tubular insert, and a sleeve, said insert and sleeve projecting from said wall and forming an annular chamber between them, said sleeve being contracted upon the end of a hose inserted into said chamber, an open vent hole being provided leading from the inward end of said chamber, whereby, if leakage takes place past said insert into said chamber, said leakage cannot build up pressure against said end wall.

2. A hose coupling as claimed in claim 1, said vent hole being in a direction substantially transverse of a portion of the end of the hose substance.

3. A hose coupling in use upon a hose comprising an end wall, an insert, a flange projecting from said wall, and a sleeve gripped by said flange, said insert and said sleeve forming an annular chamber between them, said sleeve being contracted upon the end of a hose inserted into said chamber, an open vent hole being provided leading from the inward end of said chamber, past the inward edge of said sleeve, and through said flange, to the outer air.

JOSEPH PETER EASTMAN.